United States Patent [19]

Kong et al.

[11] Patent Number: 5,790,584
[45] Date of Patent: Aug. 4, 1998

[54] HIGHLY REPETITIVE LASER EMPLOYING A ROTATING WEDGE

[75] Inventors: Hong-Jin Kong; Hyun-Su Kim; Yun-Sup Shin, all of Taejon, Rep. of Korea

[73] Assignee: Korea Advanced Institute of Science and Technology, Taejon, Rep. of Korea

[21] Appl. No.: 673,679

[22] Filed: Jun. 25, 1996

[30] Foreign Application Priority Data

Jul. 28, 1995 [KR] Rep. of Korea ............... 95-22850

[51] Int. Cl.[6] .................................................. H01S 3/08
[52] U.S. Cl. ........................... 372/98; 372/9; 372/92; 372/34; 372/16
[58] Field of Search ........................... 372/24, 107, 102, 372/18, 98, 108, 9, 92, 34, 16

[56] References Cited

U.S. PATENT DOCUMENTS

| | | | |
|---|---|---|---|
| 4,794,345 | 12/1988 | Linford et al. | 372/18 |
| 4,827,485 | 5/1989 | Scerbak et al. | 372/107 |
| 5,262,889 | 11/1993 | Fink | 372/99 |
| 5,283,796 | 2/1994 | Fink | 372/98 |
| 5,381,258 | 1/1995 | Bordignon et al. | 372/24 |
| 5,550,850 | 8/1996 | Lee et al. | 372/102 |

OTHER PUBLICATIONS

N.N. Il'ichev et al., Laser with Diffraction-Limited Divergence and Q Switching by Stimulated Brillouin Scattering, Sov. J. Quantum, electron, (Moscow)9:1161–1164 (1982).

Hui Meng and H.J. Eichler, Nd:YAG Laser with a Phase-Conjugating Mirror Based on Stimulated Brillouin Scattering in $SF_6$ Gas, Optics Letters, 16(8):569–571 (1991).

P.O. Pashinin and E.J. Shklovsky, Solid-State Lasers with Stimulated-Brillouin-Scattering Mirrors Operating in the Repetitive-Pulse Mode, J. Opt. Soc. Am. B, 5(9):1957–1961 (1988).

S. Seidel and G. Phillipps, Pulse Lengthening by Interactivity Stimulated Brillouin Scattering in a Q-Switched, Phase-Conjugated Nd:YAG Laser Oscillator, Applied Optics, 32(36):7408–78417 (1993).

Primary Examiner—Leon Scott, Jr.
Attorney, Agent, or Firm—Darby & Darby, P.C.

[57] ABSTRACT

The present invention relates to a highly repetitive laser employing a rotating wedge, and more specifically, a laser employing a rotating wedge which can provide a laser beam having a uniform spatial intensity profile with a high repetition rate. The highly repetitive laser of the invention is characterized by positioning a rotating wedge between a main resonator and a focusing lens to change the point in which a laser beam emitted from the main resonator is focused, in a laser which comprises a main resonator consisting of a laser medium, a passive Q-switching material and partially reflective mirrors and an auxiliary resonator consisting of a focusing lens and a cell. The present invention can improve the efficiency of high-power conventional lasers; and, therefore, it can be applied in advanced experiments such as second harmonic generation and amorphous silicon annealing and in the precision industry which requires a highly repetitive laser, since it can provide a laser beam having a uniform pattern and high directional properties.

13 Claims, 1 Drawing Sheet

HIGHLY REPETITIVE LASER EMPLOYING A ROTATING WEDGE

FIELD OF THE INVENTION

The present invention relates to a highly repetitive laser employing a rotating wedge, more specifically, to a novel laser employing a rotating wedge which can provide a laser beam having a uniform spatial intensity profile with a high repetition rate.

BACKGROUND OF THE INVENTION

The laser beam has been widely applied in the industry, due to its narrow frequency bandwidth and high directional properties. However, laser beam patterns provided by conventional lasers in the art which have distorted spatial intensity profiles, play an obstructive role in advanced experiments and exert harmful influences on laser maintenance. Specifically, a highly distorted spatial intensity profile may cause the destruction of the laser medium in a high-power laser. Accordingly, a variety of approaches have been made in the art to remove distortion from a spatial intensity profile.

It has been known that the distortion in the spatial profile of laser beam provided by a laser resonator is chiefly caused by higher mode oscillations, defects of optical components, irregular pumping and so on. In the prior art, a small-sized pin-hole has been employed in the laser resonator to remove distortion from the laser beam. However, the prior art has revealed a drawback in that laser output is inevitably lowered in order to obtain a laser beam of high quality.

Under these circumstances, studies have been actively carried out to solve the problems in the art; as a result a laser which can provide a laser beam having a good pattern by the aid of a scattering beam emitted from a stimulated Brillouin scattering(hereinafter referred to as "SBS") mirror has been suggested(see: P. P. Pashinin et al., J. Opt. Soc. Am. B, 5(9):1957(1988); N. N. Il'ichev et al., Sov. J. Quantum Electron 12(9):1161(1982); S. Seidel et al., Applied Optics, 32(36):7408(1993)).

The SBS beam employed in the prior art, which is a back scattering beam reflected by acoustic waves formed in a medium when a high intensity laser beam is irradiated to a non-linear material, has a spatial pattern better than that of a laser beam irradiated by spatial frequency filtering. When a laser beam emitted from a laser resonator is focused on a SBS mirror consisting of a cell which comprises a medium emitting SBS beam, the laser beam is reflected to enter the resonator, and has a uniform spatial profile with the aid of continuous spatial frequency filtering while propagating between the resonator and the cell. The effect is similar to the prior art laser where a pin hole is automatically arranged with respect to the optical axis.

The prior art laser employing the SBS mirror is, however, proven to be less satisfactory in the sense that it can not provide highly repetitive laser pulses. Moreover, the efficiency is inevitably lowered in the case of a high-power laser, since only a low-quality laser beam pattern is provided, grounded in that the liquid medium contained in the cell is over-heated in the course with repetitive irradiation of laser pulses to the cell, and finally to lower the reflectivity by the non-linear phenomenon of the medium.

SUMMARY OF THE INVENTION

In accordance with the present invention, it has been discovered that a laser employing a rotating wedge between a laser resonator and a SBS mirror to change the point in which laser beam is focused, can prevent over-heating of a liquid medium in a cell which, in turn, efficiently provides a laser beam having a uniform spatial intensity profile with a high repetition rate.

A primary object of the present invention is, therefore, to provide a novel laser which can provide a laser beam having a uniform spatial intensity profile with a high repetition rate.

BRIEF DESCRIPTION OF DRAWINGS

The above and the other objects and features of the present invention will become apparent from the following descriptions given in conjunction with the accompanying drawing, in which.

DETAILED DESCRIPTION OF THE INVENTION

Figure 1:
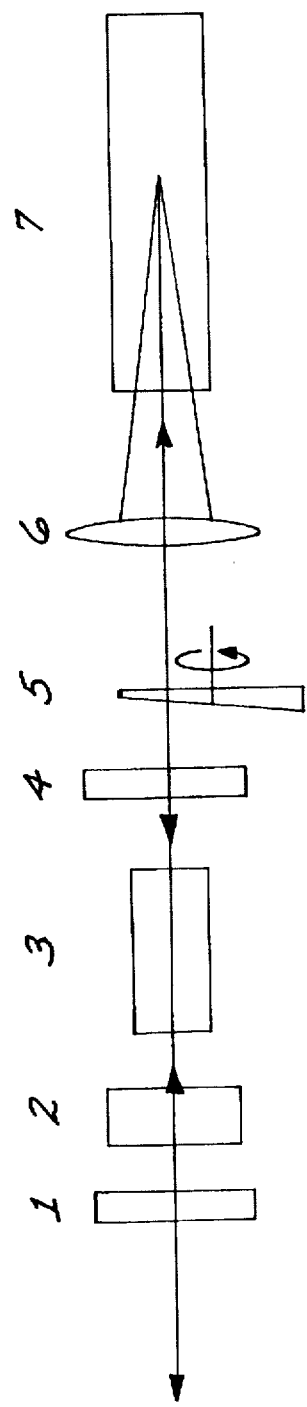
FIG. 1 is a schematic diagram showing a highly repetitive laser of the present invention.

A highly repetitive laser of the present invention is characterized by positioning a rotating wedge between a main resonator and a focusing lens to change the point in which a laser beam emitted from the main resonator is focused, in a laser which comprises a main resonator consisting of a laser medium, a passive Q-switching material and partially reflective mirrors and an auxiliary resonator consisting of a focusing lens and a cell.

A preferred embodiment of the present invention is explained in detail with references to the accompanying drawing, which should not taken to limit the scope of the invention.

FIG. 1 is a schematic diagram showing a highly repetitive laser of the invention, which comprises a main resonator(10) and an auxiliary resonator(20).

The main resonator(10) consists of a couple of partial reflective mirrors(1,4) with a reflectance of 4 to 40%, a Nd doped laser medium(3) and a passive Q-switching material (2), and the auxiliary resonator(20) consists of a cell(7) which plays a role as a SBS mirror, a focusing lens(6) which focuses a laser beam to the cell(7) and a rotating wedge(5) to change the point in which the laser beam from the main resonator(10) is focused to prevent over-heating of the liquid medium in the cell(7).

The focal length of the focusing lens(6) ranges from 5 to 25 cm, with $CS_2$ or acetone preferably employed as a medium in the cell(7). The rotating frequency of the rotating wedge(5) ranges from 0.01 to 100 Hz.

In the laser of the present invention, a laser beam emitted from the main resonator(10) is focused in the cell(7) through the focusing lens(6), and reflected by the cell(7) and directed to the main resonator(10). Then, the laser beam continuously propagates between the main resonator(10) and the cell(7), which results in a uniform spatial profile by spatial frequency filtration. In other words, when the laser beam is directed to the rotating wedge(5), the direction of the laser beam incident on the cell(7) is changed, which, in turn, continuously changes the focusing position of the laser beam in the cell(7) by the aid of the rotating wedge(5) and the focusing lens(6).

As a result, the highly repetitive laser of the invention prevents over-heating of the liquid medium contained in the cell(7) caused by the laser beam, which finally provides a high-quality laser beam pattern having a uniform spatial profile with a high repetition rate.

As clearly illustrated above, the laser employing the rotating wedge of the invention can improve the efficiency of a conventional high-powered laser. Therefore, it can be applied in advanced experiments such as second harmonic generation and amorphous silicon annealing and in the precision industry which require a highly repetitive laser, since it can provide a high-quality laser beam having a uniform pattern and high directional properties.

What is claimed is:

1. A thermal attenuator for dispersing focused thermal energy from a laser beam propagating along a beam path in a laser generator, said laser generator comprising a main resonator and an auxiliary resonator, said thermal attenuator comprising:

a rotatable wedge disposed in said beam path and interposed between said main resonator and said auxiliary resonator to continuously change the point upon which said laser beam is focused and attenuate the buildup of thermal energy from said focused beam.

2. A thermal attenuator according to claim 1 wherein:

said wedge rotates at a rotation frequency within the range of 0.01 to 100 Hertz.

3. A laser beam generator for producing a laser beam having a uniform spatial intensity profile with a high repetition rate, said laser generator including:

a main resonator comprising a laser medium, a passive Q-switching material, and a plurality of partially reflective mirrors;

an auxiliary resonator comprising a focusing lens, and a cell upon which said laser beam is focused; and a rotatable wedge disposed in said beam path and interposed between said main resonator and said auxiliary resonator to continuously change the point on said cell upon which said laser beam is focused and attenuate the buildup of thermal energy from said focused beam.

4. A laser beam generator according to claim 3 wherein:

said wedge rotates at a rotation frequency within the range of 0.01 to 100 Hertz.

5. A laser beam generator according to claim 3 wherein:

said laser medium comprises a Nd doped laser medium.

6. A laser beam generator according to claim 3 wherein:

said partially reflecting mirrors include a reflectance within the range of 4 to 40%.

7. A laser beam generator according to claim 3 wherein:

said focusing lens includes a focal length within the range of 5 to 25 centimeters.

8. A laser beam generator according to claim 3 wherein:

said cell comprises a stimulated Brillouin scattering mirror.

9. A laser beam generator according to claim 8 wherein:

said cell includes a medium comprising $CS_2$.

10. A laser beam generator according to claim 8 wherein:

said cell includes a medium comprising acetone.

11. In a laser generator which comprises a main resonator including a laser medium, a passive Q-switching material and partially reflective mirrors and an auxiliary resonator having a focusing lens and a cell, the improvement comprising a rotating wedge which is positioned between the main resonator and the focusing lens and operative to rotate at a rotation frequency within the range of approximately 0.01 to 100 Hertz to change the point in which a laser beam emitted from the main resonator is focused and attenuate the buildup of thermal energy from said focused beam.

12. A method of attenuating thermal energy from a focused laser beam propagating through a main resonator and an auxiliary resonator along a beam path, said respective resonators separated by an optical wedge disposed along said beam path, said method including the steps of:

directing said laser beam along said beam path; and rotating said wedge to continuously change the point upon which said laser beam is focused and attenuate the buildup of thermal energy from said focused beam.

13. A method according to claim 11 wherein said step of rotating includes rotating said wedge at a rotation frequency of between 0.01 to 100 Hertz.

* * * * *